United States Patent Office 3,521,160
Patented July 21, 1970

3,521,160
METHOD OF MAKING A MAGNETIC GAUGE FOR MEASURING THICKNESS OF NON-MAGNETIC LAYERS ON FERROMAGNETIC SUPPORTS
Hans Nix, 9–11 Ebernburgweg, Cologne-Nippes, Germany, and Erich Steingroever, 33 Flensburger Strasse, Bonn, Germany
Filed Apr. 22, 1968, Ser. No. 723,134
Claims priority, application Germany, Apr. 22, 1967, N 30,394
Int. Cl. G01r 33/12
U.S. Cl. 324—34
2 Claims

ABSTRACT OF THE DISCLOSURE

A housing contains a permanent magnet to be placed in contact with a non-magnetic layer supported on a ferromagnetic base. The magnet is mounted on the end of a balanced rotatable arm to which a dial is coupled over a spring. The dial is subdivided to indicate the thickness of the layer, and by turning the dial until the increasing tension of the spring breaks the magnetic contact, the thickness of the layer can be read directly on the dial. The permanent magnet is demagnetized for proper adjustment of spring tension and magnetic adhesive force, thereby improving the sensitivity of the instrument.

---

This invention relates to a device for determining the thickness of non-magnetic layers or coatings on iron or other ferromagnetic supports.

The device is based on the principle of measuring the attractive force of a permanent magnet placed on said layer which force depends on the thickness of the layer, and is an improvement of the device disclosed in our German Pat. No. 869,125.

In a magnetic thickness gauge of this type, a rod-shaped permanent magnet, e.g., of a high grade Al-Ni alloy, is secured to a rotary system which is supported in its centre of gravity. The assembly is disposed in a hammer-like housing in such a manner that the magnet is the hammer-head and can project therefrom with one of its poles when attracted by the ferromagnetic support to contact the non-magnetic layer whose thickness is to be determined. The rotary system is provided with a key which comes out of the housing when the contact of the magnet with the specimen to be measured is broken and the rotary system moves to return the magnet into the housing. By pressing the key, the magnet is brought again into contact with the surface to be measured.

The rotary system comprises a balanced rotating arm to which a measuring dial is coupled over a spring. By turning the measuring dial, the spring is strained until the magnetic contact breaks, whereby the dial is so calibrated as to allow the direct reading of the thickness to be measured.

The gauge allows of testing non-magnetic surface layers, such as paints and coatings, on iron and steel in any position.

In the production of such thickness gauges, it has been customary to select permanent magnets of a certain attractive force and to combine them with a suitable measuring spring. This method is relatively complicated, and magnets of different attractive force cannot be used.

The invention presents a new method for the manufacture of such thickness gauges. In accordance with the invention, the attractive force of the permanent magnet is, by demagnetization with a magnetic alternating field, adjusted exactly to the force of the respective spring. Thereby, it is of advantage to use such a strong demagnetization that the magnets possess at most 50% of the attractive force in fully magnetized state so as to obtain together with the adjustment to the correct value also a sufficient stabilization against external influences (outside fields, etc.).

It is known to weaken electrical moving coil instruments by demagnetizing their permanent magnet to the desired value of sensitivity. Thereby, the sensitivity decreases the more, the more the permanent magnet is demagnetized. In the apparatus of the invention, however, the opposite takes place.

A magnet which is demagnetized in accordance with the invention reaches a certain predetermined attractive force, controlled by the force of the spring employed, at a smaller thickness of the layer than a fully magnetized magnet. In other words, the thickness gauge becomes more sensitive by demagnetization. Nonetheless, it becomes at the same time less sensitive against outside influences if its permanent magnet is stronger demagnetized.

By means of the demagnetization according to the invention, it becomes possible to adjust permanent magnets with relatively strongly differing attraction forces (in the fully magnetized state) to the force of the respective spring of an instrument so that also the spring forces can present a certain tolerance with respect to each other. It is surprising that the scale calibration produced in this way with different magnets and springs, are relatively uniform or differ only slightly from each other so that the entire character of the scale image remains the same.

The invention is illustrated, by way of example, in the accompanying drawings, wherein.

Figure 1:
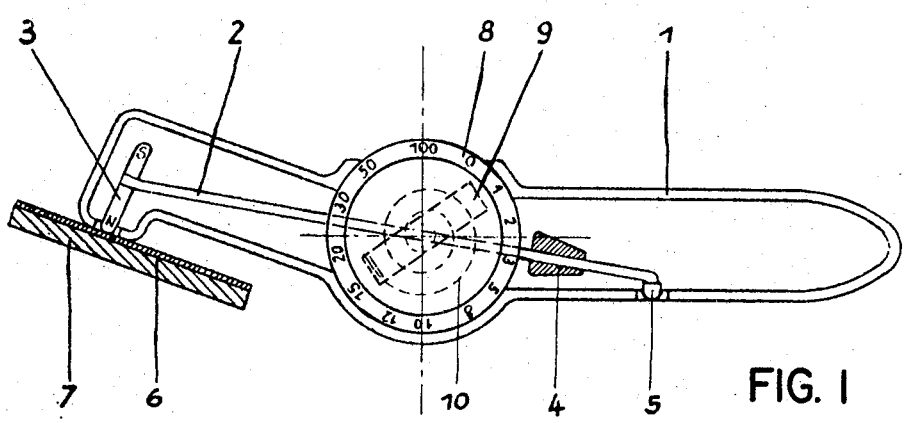
FIG. 1 is a cross-sectional view of a device to which the invention can be applied.
Figure 2:
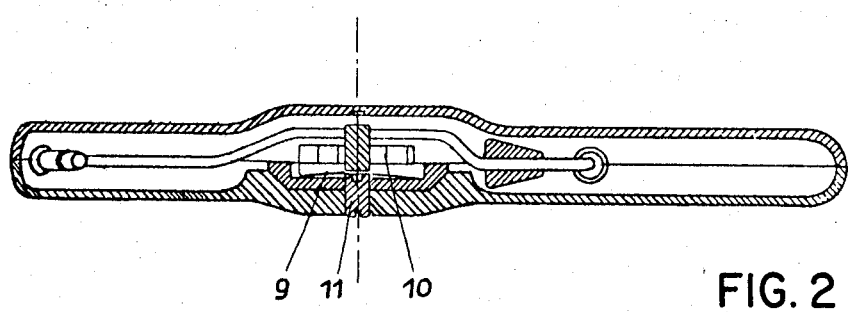
FIG. 2 is a plan elevational view of the device of FIG. 1 in section.
Figure 3:
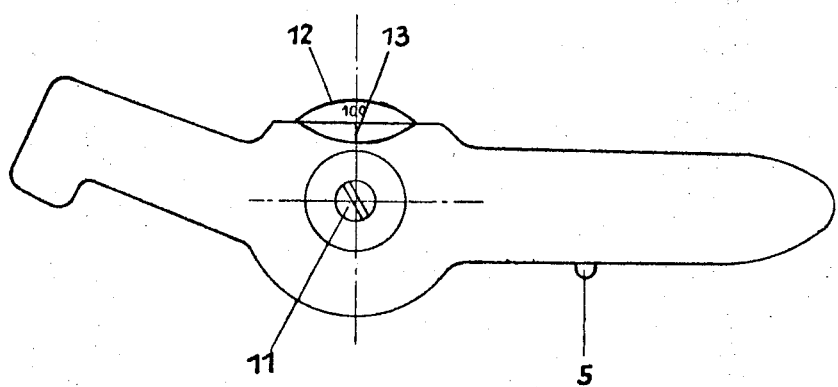
FIG. 3 is a side elevational view of the devices, in the closed position.

Referring now first to FIGS. 1–3 of the drawings, a rotary system 2 is arranged in a hammer-shaped casing 1. A rod-shaped permanent magnet 3 with poles N and S disposed in the head of the casing is fixed to the rotary system and balanced by the counter weight 4. The rotary system is provided with a key 5 which emerges from the casing when the magnet 3 breaks away from the surface of the non-magnetic layer 6 coating the ferromagnetic base 7.

By pressing the key 5, the semi-spherical polished projecting pole of the magnet 3 is brought again in contact with said surface, and the test can be repeated. In this way, the adjustment of the device being left unchanged, the surface to be tested can be examined at a great number of places quickly for uniform thickness of the coating layer. The rotary system is turned by means of a dial 8 whose corrugated rim projects from the casing and which, through the resiliently connected finger 9, tensions the coil spring 10 connected to the axis of the rotary system. The finger 9 lies resiliently on the dial and can be turned from the outside by means of the bushing 11, which at the same time forms the bearing for the rotary system; in this way, the zero point of the dial can be made coincident with the point where the magnet breaks away from a blank ferromagnetic base.

By turning the dial 8, the spring 10 is tensioned until the magnetic contact breaks and the magnet recoils into the housing; at that point, the thickness of the tested layer can be directly read on the visible part 12 of the dial 8 at 13 (FIG. 3).

Figure 4:
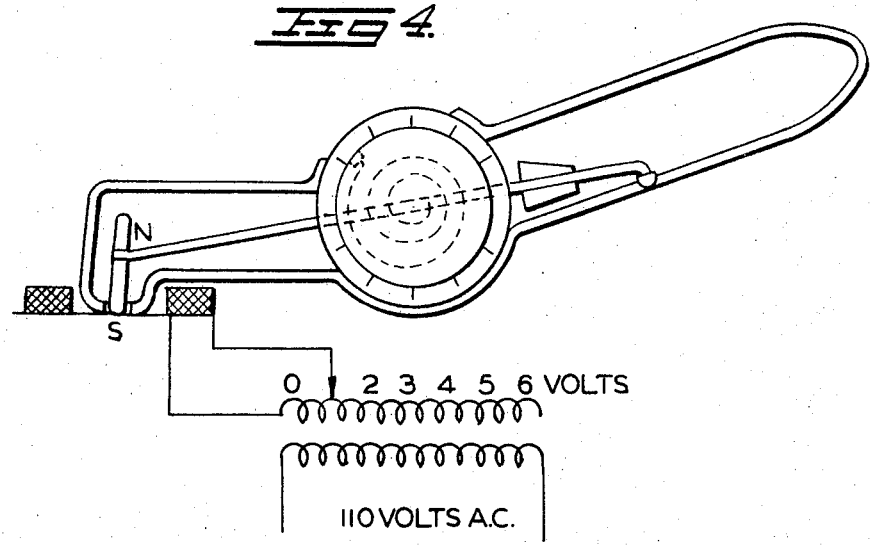
FIG. 4 illustrates the ajustment of the magnetization of the magnet of the gauge in accordance with the invention.
Figure 5:
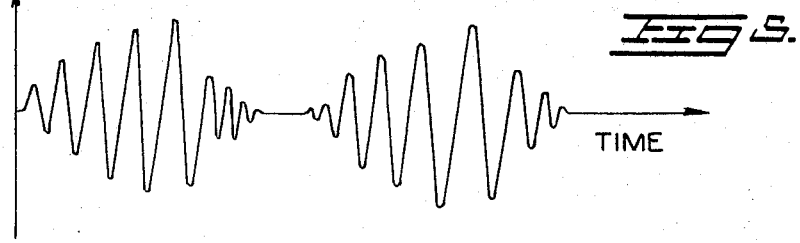
FIG. 5 shows the form of the produced magnetic alternating field.

The adjustment of the magnetization of the permanent magnet is made by an A.C. coil connected to a variable transformer (FIG. 4). By raising and lowering the current in the coil, a magnetic alternating field of the form of FIG. 5 is produced, which must have an intensity necessary to weaken the magnet to the right value.

Figure 6:
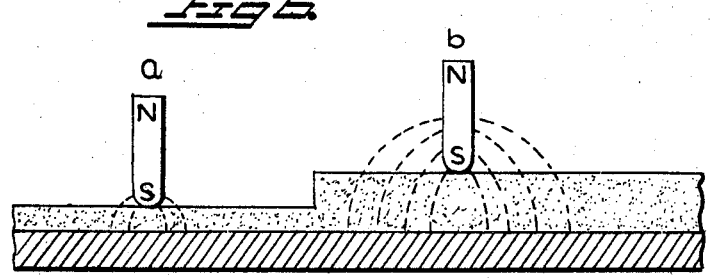
FIG. 6 shows diagrammatically how according to the invention, a weak and strong magnet may both give the same attractive force.

FIG. 6 shows at (a) a weak magnet and at (b) a stronger magnet both the same attractive force on a thin and on a thick non-magnetic layer.

We claim:
1. A method of making a magnetic gauge for measuring the thickness of a non-magnetic layer on a ferromagnetic support of the type which includes a housing, a rotary system inside said housing, a permanent magnet carried by said system and adapted to project through an opening of said housing and to contact said layer, means to move said magnet into contact with the layer to be measured, a spring tensioning said rotary system, and a rotatable dial having predetermined indicia thereon calibrated in terms of thickness of non-magnetic layers to be measured connected to said spring and projecting through another opening of said housing, comprising the steps of demagnetizing said permanent magnet to adjust its attractive force specifically to the force of said spring and to the calibration of said dial so as to increase the sensitivity of the gauge and to provide correct readings of thickness on said dial.

2. A method of making a magnetic thickness gauge according to claim 1 wherein the magnet is demagnetized to the extent that it retains at most 50 percent of its attractive force in the fully magnetized stae.

References Cited

UNITED STATES PATENTS

| 2,810,867 | 10/1957 | Gilbert | 317—157.5 |
| 3,235,776 | 2/1966 | Ireland | 324—45 |

FOREIGN PATENTS

| 779,768 | 8/1958 | Great Britain. |
| 966,903 | 8/1964 | Great Britain. |

OTHER REFERENCES

Bennett, R.: A Review of Methods for Coating-Thickness Determination, Journal of Scientific Instruments, vol. 26, June 1949, pp. 209–215.

RUDOLF V. ROLINEC, Primary Examiner

R. J. CORCORAN, Assistant Examiner